US009684355B2

(12) United States Patent
Yung

(10) Patent No.: US 9,684,355 B2
(45) Date of Patent: Jun. 20, 2017

(54) IDENTIFYING POWER STATE CHANGES

(71) Applicant: Intel Corporation, Santa Clara, CA (US)

(72) Inventor: Weng-Chin Winson Yung, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 303 days.

(21) Appl. No.: 14/206,772

(22) Filed: Mar. 12, 2014

(65) Prior Publication Data

US 2015/0261278 A1 Sep. 17, 2015

(51) Int. Cl.
*G06F 1/32* (2006.01)

(52) U.S. Cl.
CPC ............ *G06F 1/3209* (2013.01); *G06F 1/329* (2013.01); *Y02B 60/144* (2013.01); *Y02B 60/32* (2013.01)

(58) Field of Classification Search
CPC ...... G06F 1/3209; G06F 1/329; G06F 1/3206; G06F 1/3215
See application file for complete search history.

(56) References Cited

U.S. PATENT DOCUMENTS

| | | | | |
|---|---|---|---|---|
| 2007/0270129 A1* | 11/2007 | Luo | ......................... | H04W 4/02 455/414.1 |
| 2009/0303066 A1* | 12/2009 | Lee | ................... | H04M 3/42136 340/679 |
| 2009/0307519 A1* | 12/2009 | Hyatt | ..................... | G06F 1/3203 713/502 |
| 2010/0312946 A1* | 12/2010 | Bold | ...................... | G06F 1/3203 711/102 |
| 2010/0332883 A1* | 12/2010 | Saxe | ...................... | G06F 1/3203 713/324 |
| 2013/0007494 A1* | 1/2013 | Branover | .............. | G06F 1/3203 713/323 |
| 2013/0139138 A1* | 5/2013 | Kakos | ....................... | G06F 8/65 717/168 |
| 2015/0127819 A1* | 5/2015 | Cimino | .............. | H04L 43/0876 709/224 |

FOREIGN PATENT DOCUMENTS

| | | |
|---|---|---|
| CN | 103460189 A | 12/2013 |
| TW | 201202915 | 1/2012 |

OTHER PUBLICATIONS

R.O.C. Search Report, Patent Application No. 104102846, completed Feb. 2, 2016, 2 pages.

* cited by examiner

*Primary Examiner* — Thomas Lee
*Assistant Examiner* — Chad Erdman
(74) *Attorney, Agent, or Firm* — International IP Law Group, P.L.L.C.

(57) ABSTRACT

Techniques for detecting mobile computing power states are described herein. An active state may be detected in a mobile computing device. A timestamp may be requested at predetermined intervals while in the active state. A first timestamp and a second timestamp may be received in response to the timestamp requests. If a difference between a first time stamp and a second time stamp exceeds the predetermined interface, the mobile computing device is identified to have entered a sleep state during a time period indicated by the determined timestamp difference.

19 Claims, 8 Drawing Sheets

IDENTIFYING POWER STATE CHANGES

TECHNICAL FIELD

This disclosure relates generally to state detection. More specifically, the disclosure describes state detection in a mobile computing device.

BACKGROUND

Mobile computing devices are becoming more common place in the market. Despite large growth of the mobile computing device market, applications configured to run on a mobile computing device, such as a smartphone, or tablet computer, may not be optimized in terms of energy efficiency. Many mobile computing devices include operating systems that enter a sleep state to preserve power. However, in mobile computing devices, very little data regarding energy efficiency is available to an end-user without rooting the mobile computing device, and/or running a modified operating system image.

DETAILED DESCRIPTION

The subject matter disclosed herein relates to techniques for monitoring energy usage and detecting state transitions in a mobile computing device environment. More specifically, the techniques described herein relate to a user-space application, such as a power monitoring application, to monitor energy usage and request timestamps at predetermined intervals during an active state. When the mobile computing device enters a sleep state, the user-space application will freeze resulting in a suspension of the requests for timestamps until the mobile computing device reenters the active state. Upon reentering the active state, the requests for timestamps will resume. When a difference between two subsequent timestamps is greater than the threshold, the power monitoring application may identify that the mobile computing device entered into a sleep state. Further, the techniques described herein are not specific to a given mobile computing device platform.

A "power state," as referred to herein, indicates a threshold of power consumption of the mobile device. In some embodiments, a power state is defined by the Advanced Configuration and Power Interface (ACPI), Revision 5.0a, Nov. 13, 2013. In embodiments, an "S0" state is an "on" state, or a working state, wherein the mobile computing device is fully operational, fully powered, and retains context. The S0 state may be referred to herein as an "active state." An "S3" state is a sleep state, wherein the mobile computing device consumes less power than the S0 state, and the contexts associated with processes of the mobile computing device are suspended to a memory unit, such as random access memory (RAM) unit.

Figure 1:
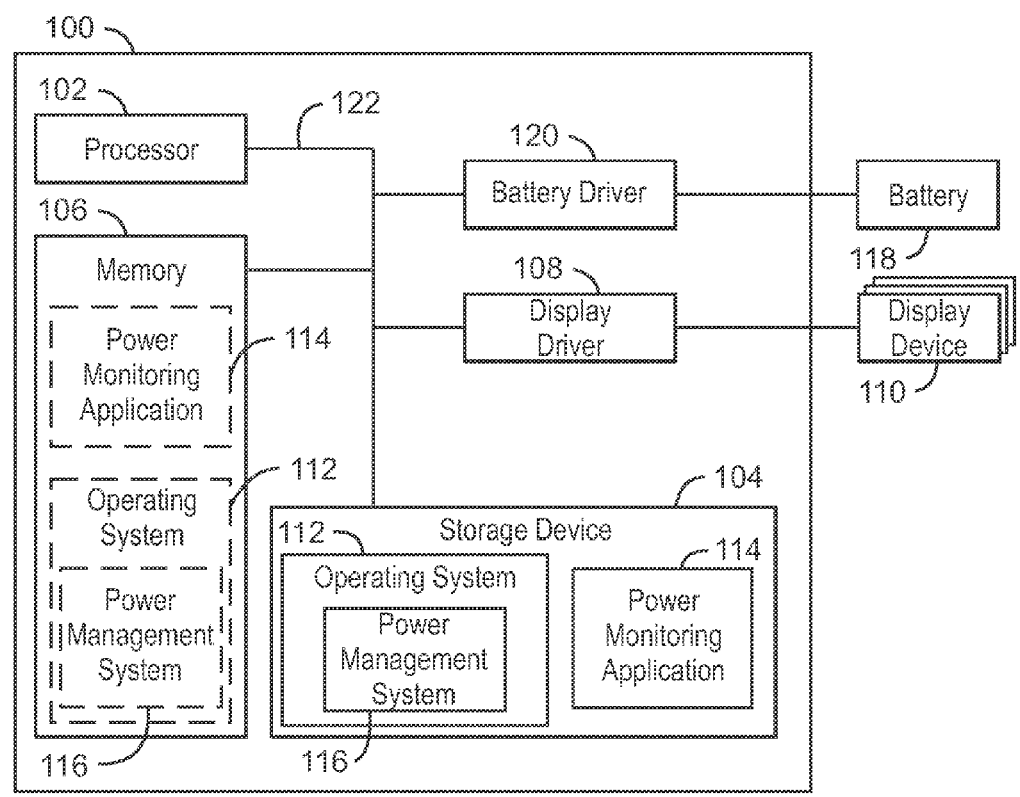
FIG. 1 is a block diagram of a mobile computing device having a power monitoring application to detect the mobile computing device power state.

FIG. 1 is a block diagram of a mobile computing device having power monitoring application to detect the mobile computing device power state. The mobile computing device 100 may include a processor 102, a storage device 104 comprising a non-transitory computer-readable medium, and a memory device 106. The mobile computing device 100 may include a display driver 108 configured to operate a display device 110 to render images. As illustrated in FIG. 1, the storage device 104 may also include an operating system 112 having a power management system 116, and a power monitoring application 114. As indicated by the dashed boxes 112, 114, and 116, when in operation, the operating system 112, as well as the power monitoring application 114 may be running in memory space of the memory device 106, as indicated by the dashed boxes 112, 114, 116 of the memory unit 106 of FIG. 1.

The power monitoring application 114 may be a set of instructions stored on the storage device 104, that when executed by the processor 102, direct the mobile computing device 100 to perform operations. As discussed above, during operation the power monitoring application 114 is implemented in user space of the memory device 106. The operations of the power monitoring application 114 include detecting when the mobile computing device 100 is in an active state, and requesting timestamps at predetermine intervals that remain the same while in the active state. For example, the power monitoring application 114 may be configured to request timestamps every 1 second. When a first timestamp and a second time stamp are received in response to the timestamp request, the power monitoring application 114 may determine if a difference between the first time stamp and the second time stamp received exceeds the predetermined interval, for example, when the difference is greater than 1 second. If the time difference does exceed the predetermined interval, the power monitoring application 114 identifies the mobile computing device 100 has entered into a sleep state during a time period indicated by the determined timestamp difference.

The operating system 112 is a mobile operating system configured to manage resources and applications of the mobile computing device 100. In one embodiment, the operating system is a Linux-based system, such as the Android operating system built on a Linux kernel. The operating system 112 enables the power monitoring application 114 to run only in a user space, as opposed to both a user space as well as a kernel space. The operating system 112 may be associated with a system clock configured to track the passing of time within the operations of the mobile computing device 100. The requests for timestamps presented by the power monitoring application 114 at the predetermined regular intervals associated with the power monitoring application 114 operation may be responded to by the operating system 112 providing timestamps based on the system clock.

In embodiments, the power management system 116 may be an integrated module of the operating system 116. However, the power management system 116 may be a discrete module of the storage device 104 to be executed by the processor 102. In either embodiment, the power management system 116 may implement power state transitions, monitor power consumption, and provide additional power consumption data to the power monitoring application 114.

In some embodiments, the power monitoring application 114 may issue power consumption level requests to the power management system 116. In other scenarios, the power monitoring application 114 may issue power consumption level requests, or requests for event indications, directly to drivers of the mobile computing device 100. For example, the mobile computing device 100 may also include a battery 118 and a battery driver 120 configured to control and monitor operations of the battery 118, such as voltage, or current being drawn from the battery. In some scenarios, the power monitoring application 114 may request data directly from the battery driver 120 related to power consumption information. In other scenarios, the power monitoring application 114 may request event indications directly from the operating system 112. For example, when the display device 110 is turned on, turned off, adjusted, or the like, the operating system 112 may receive event data to provide to the power monitoring application 114 indicating a given event related to power consumption.

The mobile computing device 100, as referred to herein, is a computing device wherein components such as a processing device, a storage device, and a display device are disposed within a single housing. For example, the mobile computing device 100 may be a tablet computer, a smartphone, a handheld videogame system, a cellular phone, an all-in-one slate computing device, or any other computing device having all-in-one functionality.

The processor 102 may be a main processor that is adapted to execute the stored instructions. The processor 102 may be a single core processor, a multi-core processor, a computing cluster, or any number of other configurations. The processor 102 may be implemented as Complex Instruction Set Computer (CISC) or Reduced Instruction Set Computer (RISC) processors, x86 Instruction set compatible processors, multi-core, or any other microprocessor or central processing unit (CPU).

The memory device 106 can include random access memory (RAM) (e.g., static random access memory (SRAM), dynamic random access memory (DRAM), zero capacitor RAM, Silicon-Oxide-Nitride-Oxide-Silicon (SONOS), embedded DRAM, extended data out RAM, double data rate (DDR) RAM, resistive random access memory (RRAM), parameter random access memory (PRAM), etc.), read only memory (ROM) (e.g., Mask ROM, programmable read only memory (PROM), erasable programmable read only memory (EPROM), electrically erasable programmable read only memory (EEPROM), etc.), flash memory, or any other suitable memory systems. The main processor 102 may be connected through a system bus 122 (e.g., Peripheral Component Interconnect (PCI), Industry Standard Architecture (ISA), PCI-Express, HyperTransport®, NuBus, etc.) to components including the storage device 104 and the memory unit 106.

The display interface 110 may be a point of interaction with software or hardware of the mobile computing device 100 and the display device 112. For example, the display interface may be a digital video interface (DVI), a high-definition multimedia interface (HDMI), and the like. The display may be a built-in display, or a peripheral display of the mobile computing device 100. In embodiments, the display 112 includes touch-screen functionality.

The block diagram of FIG. 1 is not intended to indicate that the mobile computing device 100 is to include all of the components shown in FIG. 1. Further, the mobile computing device 100 may include any number of additional components not shown in FIG. 1, depending on the details of the specific implementation.

Figure 2:
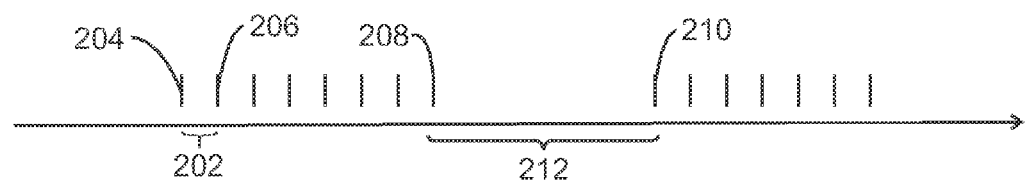
FIG. 2 is diagram illustrating a timeline wherein timestamps are requested at predetermined intervals, and sleep states are determined.

FIG. 2 is diagram illustrating a timeline wherein timestamps are requested at predetermined intervals, and sleep states are determined. The timeline 200 illustrates timestamps are requested at a predetermined interval, as indicated at 202. In other words, the time difference between a timestamp requested by a user-space application, such as the power monitoring application 114 of FIG. 1, occurring at 204, and the timestamp requested at 206, will be equal to the predetermined interval 202 when the device is active. However, at 208 a first timestamp may be requested and at 210 a second timestamp may be requested. If the difference between the first timestamp 208 and the second timestamp 210, indicated by 212, is greater than the predetermined interval 202, then the power monitoring application 114 may identify entry into, and exit from, a sleep state. As discussed in more detail below, the entry into, and exit from, the sleep state may be logged by the power monitoring application 114, and presented to a user via a graphical user interface on a display, such as the display device 110 discussed above in reference to FIG. 1.

In some embodiments, the accuracy of the determination of when a mobile computing device, such as the mobile computing device 100 of FIG. 1, is related to the frequency of timestamp requests. In other words, the shorter the predetermined interval is, the more accurate the determination of entry into a sleep state, as well as exit from the sleep state, will be. In some examples, the predetermined interval 202 is 1 second. However, the predetermined interval 202 may be shorter than 1 second to improve accuracy of power state transition detections. It is noted that shorter predetermined intervals may affect power consumption, and therefore, the predetermined interval may be set by a user, or a developer of the power monitoring application 114, in view of the power consumption increases that may occur as a result of increasingly shorter predetermined intervals.

Figure 3:
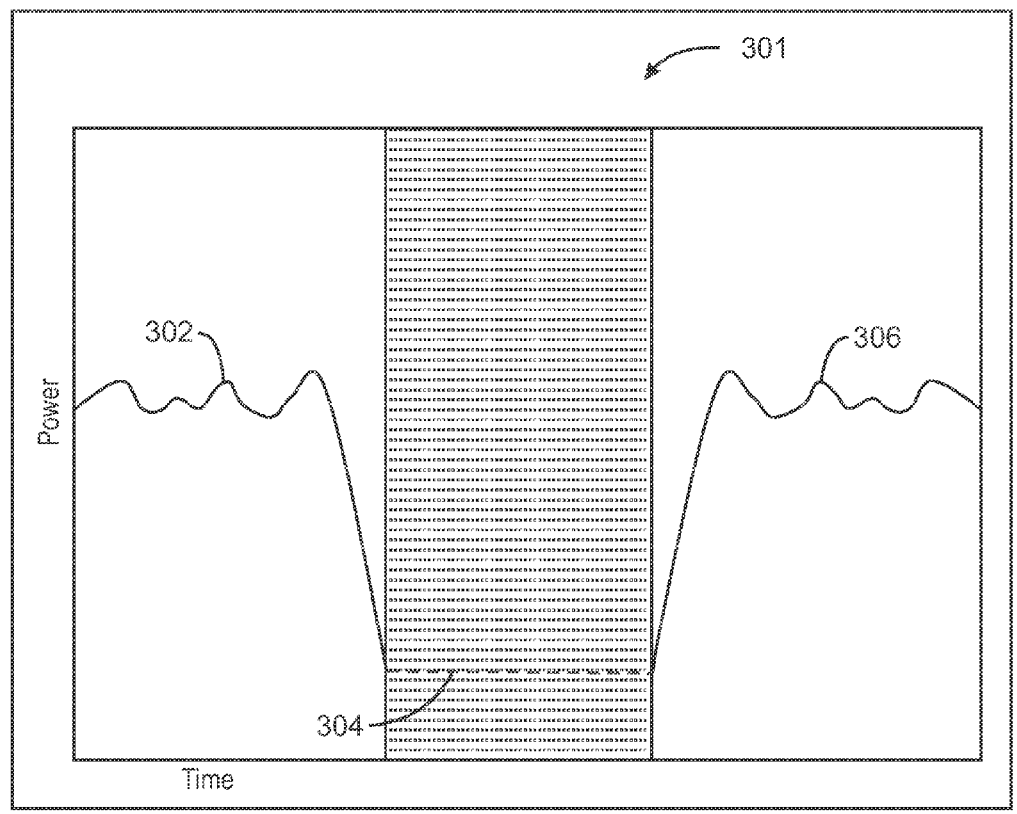
FIG. 3 is a diagram of a graphical user interface (GUI) to render energy usage information as well as mobile computing device power state changes.

FIG. 3 is a diagram of a graphical user interface (GUI) to render energy usage information as well as mobile computing device power state changes. As discussed above, a GUI 300 may be rendered and presented on a display device, such as the display device 110 discussed above in reference to FIG. 1. The GUI 300 may render a graph 301, such that a user may have greater access to power consumption data of the mobile computing device 100. Along with each timestamp request, power consumption values may be gathered by the power monitoring application 114 for the mobile computing device 100. The line 302 indicates power consumption at various values until, at 304, the mobile computing device 100 enters the sleep state. The line at 306 illustrates the mobile computing device 100 reentering the active state. As illustrated in FIG. 3, during sleep state 304, the power consumption level is low compared to the active states, even though the mobile computing device 100 may continue to consume power due to device power leakage and certain components of the mobile computing device 100 that may be required to remain on during the sleep state, illustrated by the line 302 or the line 306.

In some embodiments, power consumption may be graphed for a particular application running on the mobile computing device 100. For example, the line at 302, or at 306, may indicate power consumed by a specific application running on the computing device 100 during an active state. In this scenario, the particular application may be selectable by the user via controls of the power monitoring application 114.

In some scenarios, a given application may continue to consume higher amounts of power during a sleep state. In this scenario, the line 304 may be relatively higher, and the graphical representation on the GUI 300, or in any of the GUIs discussed below in regard to FIG. 4 and FIG. 5, may enable a user to determine that a specific application is consuming power, even during the sleep state. Therefore, the graphical representation may provide the user with more information regarding power consumption of the mobile computing device 100.

Figure 4:
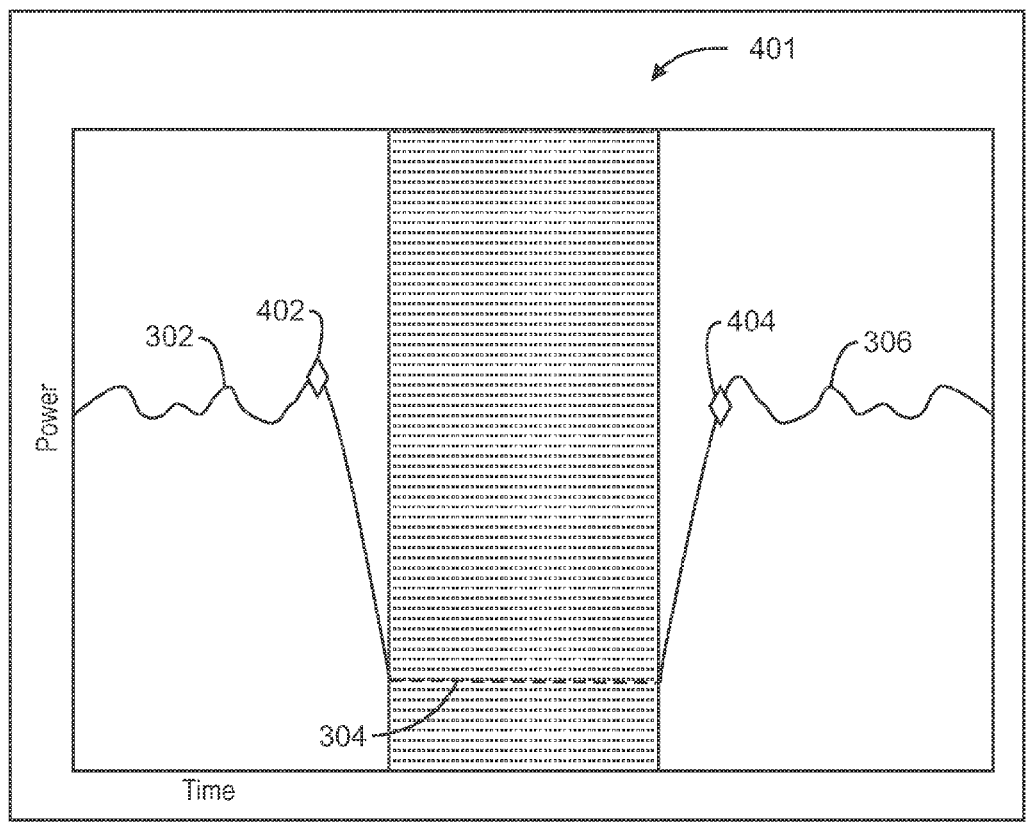
FIG. 4 is a diagram of a graphical user interface (GUI) to render energy usage information as well as event indications related to mobile computing device power state changes.

FIG. 4 is a diagram of a graphical user interface (GUI) to render energy usage information as well as event indications related to mobile computing device power state changes. The GUI 400 includes a graph 401 illustrating power consumption of a mobile computing device, such as the mobile computing device 100 of FIG. 1. Similar to FIG. 3, the graph 401 rendered illustrates power consumption levels during active states 302, 306, and the sleep state 304. The graph 401 may also illustrate event indications, such as the event indications 402 and 404. Event indications may be based on captured event information related to a timestamp causing entry into, or exit from, the sleep state. As discussed in more detail below, the event information may be captured, rendered, and displayed.

Figure 5:
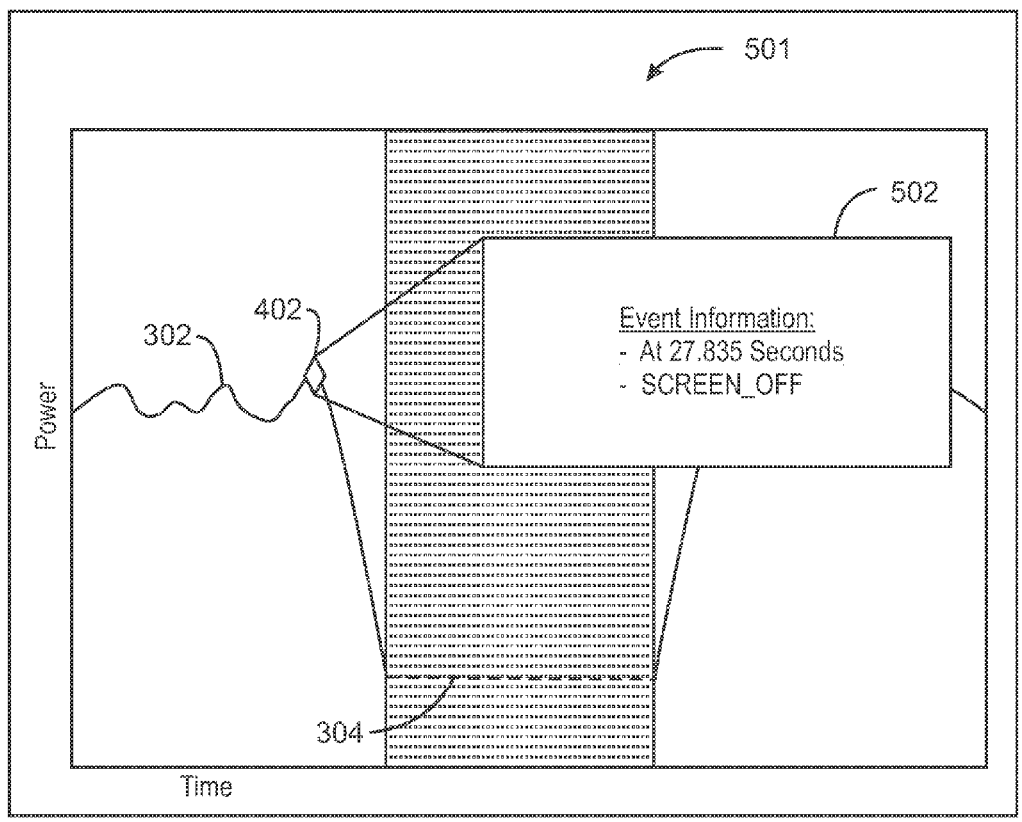
FIG. 5 is a diagram of a graphical user interface (GUI) to render energy usage information as well as event indication information.

FIG. 5 is a diagram of a graphical user interface (GUI) to render energy usage information as well as event indication information. The GUI 500 includes a graph 501 and an example of specific event information captured for an event indication, such as the event indication 402 discussed above in regard to FIG. 4. As illustrated in FIG. 5, the event indication 402 may be associated with event information indicated in the box 502. The event information 502 may include timestamp information as well as a description of the event information 502. In the example illustrated in FIG. 5, the event information description includes "SCREEN_OFF," indicating to a user that the event associated with a transition from the active state indicated at 302, to the sleep state 304, may have been triggered by turning the screen off.

Figure 6:
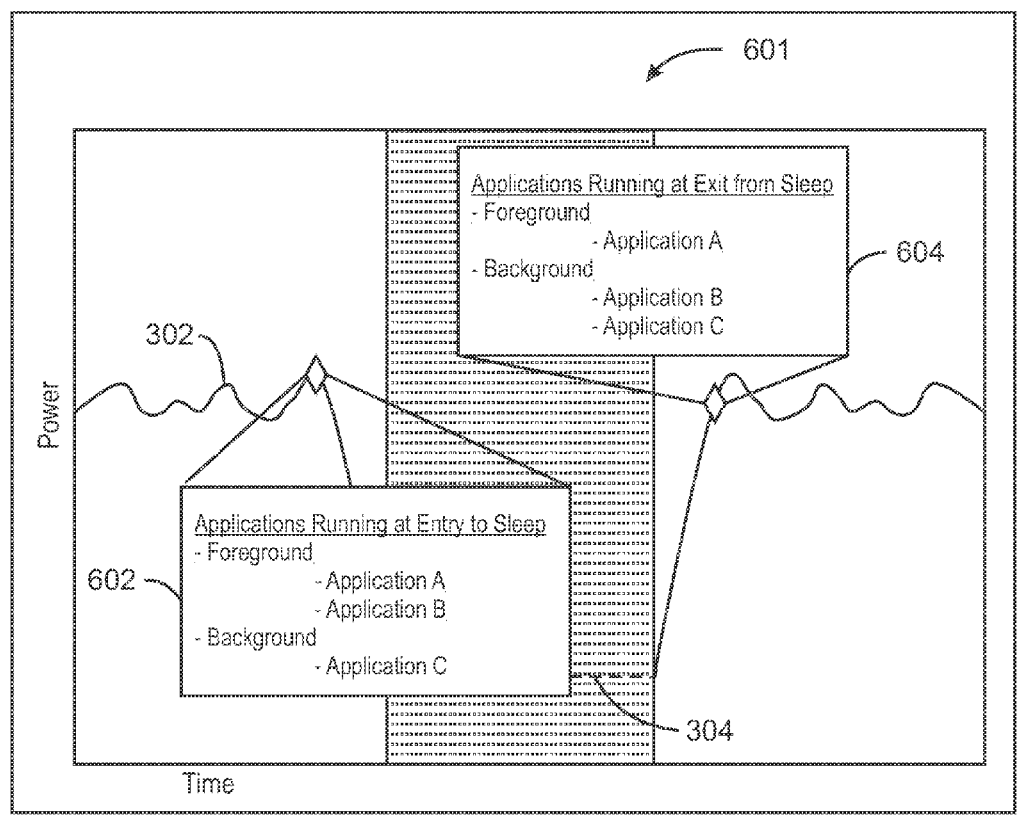
FIG. 6 is a diagram of a graphical user interface (GUI) to render energy usage information as well as application information.

FIG. 6 is a diagram of a graphical user interface (GUI) to render energy usage information as well as application information. The GUI 600 includes a graph 601 and an example of application information. Application information may be derived by identifying which applications are running at a timestamp immediately previous to entry to the sleep state 304, such as the first timestamp 208 discussed in reference to FIG. 2 above. Application information may also be derived by identifying which applications are running at a timestamp immediate subsequent to exit from the sleep state, such as the second timestamp 210 discussed in reference to FIG. 2 above.

For example, application information rendered at 602 indicates applications running on the mobile computing device 100 during entry into the sleep state 304. As illustrated at 602, the application information may include applications running in the foreground, as well as applications running in the background before entry into the sleep state 304. At 604, application information is provided indicating applications running on the mobile computing device 100 at exit from the sleep state 304. Similar to block 602, the application information at block 604 includes applications running in the background and foreground during exit from the sleep state 304. In embodiments, a user may utilize the application information 602, 604 to estimate an application initiating exit from the sleep state 304. For example, the "Application A," indicated at 602 and 604 remains in the foreground during both entry into, and exit from, the sleep state 304, while the "Application B" transitions to background during the sleep state 304. In this scenario, Application A may be responsible for the exit from the sleep state 304 as it was running in the foreground upon exit from the sleep state 304. Therefore, application information may be useful to determine applications causing an exit from the sleep state 304.

Figure 7:
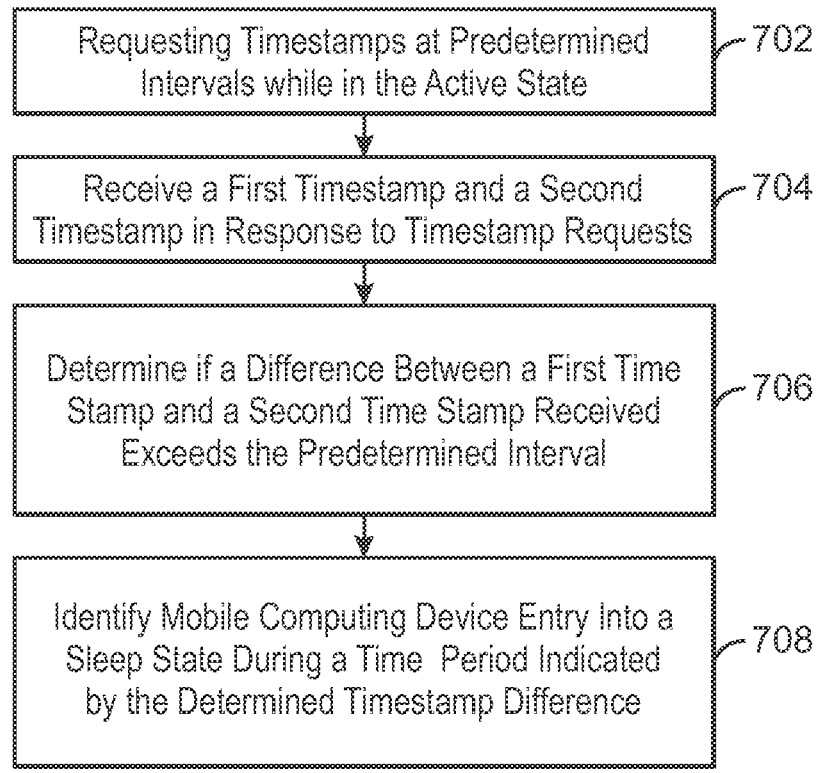
FIG. 7 is a block diagram illustrating a method of detecting mobile computing device power state changes.

FIG. 7 is a block diagram illustrating a method of detecting mobile computing power state changes. At block 702, timestamp requests are initiated at predetermined intervals. In some examples, the predetermined interval may be every 1 second. At 704, a first timestamp and a second timestamp are received in response to timestamp requests. At 706, the difference between the first time stamp and the second time stamp is determined. If the difference between the first time stamp and the second time stamp is determined to be larger than the predetermined interval, the mobile computing device is identified, at block 708, to have entered into and out of a sleep state during the time period indicated by the timestamp difference.

In embodiments, the method 700 includes capturing event information for the first timestamp, and/or capturing event information for the second timestamp. The event information may indicate a trigger for entry into, or out of, the sleep state. For example, an event, such as a "SCREEN_OFF" event at 402 and of FIG. 5, may trigger a transition from an active state to a sleep state. In other scenarios, an event, such as a "SCREEN_ON" may trigger exit from a sleep state to the active state. Other event information may be captured such as power consumption information for a specific application, as well as event information for the specific application.

In embodiments, the method 700 includes rendering an illustration of the power state change comprising the identification of the entry into the sleep state in a graphical user interface of a display of the mobile computing device. The illustration may also represent exit from the sleep state to the active state. Further, in some scenarios, the illustration may present information, such as event information, and specific application power consumption information, as discussed above.

Figure 8:
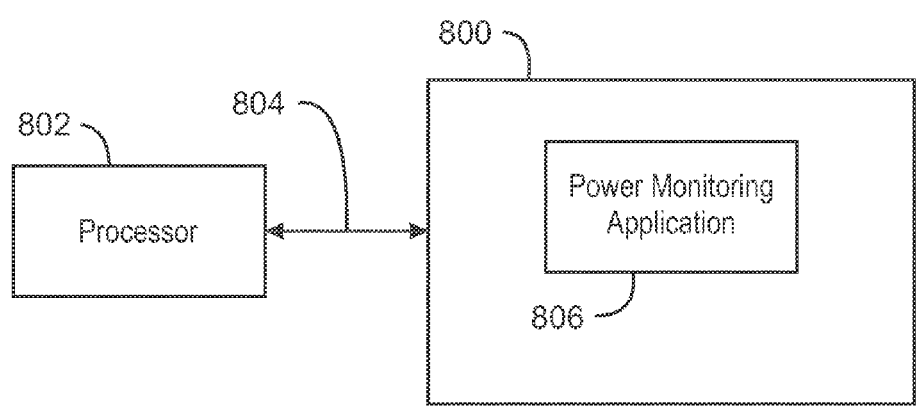
FIG. 8 is a block diagram depicting an example of a tangible, non-transitory computer-readable medium configured to detect power state changes.

FIG. 8 is a block diagram depicting an example of a tangible, non-transitory computer-readable medium configured to detect power state changes. The tangible, non-transitory, computer-readable medium 800 may be accessed by a processor 800 over a computer bus 804. Furthermore, the tangible, non-transitory, computer-readable medium 800 may include computer-executable instructions to direct the processor 802 to perform the steps of the current method.

The various software components discussed herein may be stored on the tangible, non-transitory, computer-readable medium 800, as indicated in FIG. 8. For example, a power monitoring application 806 may be configured to issue timestamp requests at predetermined intervals. In some examples, the predetermined interval may be every 1 second. A first timestamp and a second timestamp are received by the power monitoring application 806 in response to timestamp requests. The power monitoring application determines the difference between the first time stamp and the second time stamp. If the difference between the first time stamp and the second time stamp is determined to be larger than the predetermined interval, the mobile computing device is identified by the power monitoring application 806, to have entered into and out of a sleep state during the time period indicated by the timestamp difference.

EXAMPLE 1

A method of identifying power states of a mobile computing device are described herein. Timestamps are requested at predetermined intervals while in an active state. A first and second timestamp may be received. If the difference between the first time stamp and the second timestamp exceeds the predetermined interval, then the mobile computing device has entered into a sleep state and exited the sleep state during the time difference of the timestamps.

Event information may also be captured. Event information may be data relating to the events occurring at the mobile computing device that relate to entry into, or exit from, a sleep state. The information captured may be rendered at a graphical user interface of the mobile computing device.

EXAMPLE 2

A system for monitoring power states is described herein. The system may include a processing means, such as a processing device, and a memory means, such as a system memory unit. The system memory unit may include instructions executable by the processing device to initiate operations. The operations include requesting timestamps at predetermined intervals while in an active state. The operations include receiving a first timestamp and a second time stamp in response to timestamp requests, and determining if a difference between a first time stamp and a second time stamp received exceeds the predetermined interval. If it is determined that the time difference between timestamps exceeds a predetermined threshold, then the operations include identifying mobile computing device entry into a sleep state during a time period indicated by the determined timestamp difference.

EXAMPLE 3

A non-transitory computer readable medium is described herein. The non-transitory computer readable medium includes code, when executed, to cause a processing device request timestamps at predetermined intervals while in an active state, and receive a first timestamp and a second time stamp in response to timestamp requests. The code, when executed, determines if a difference between a first time stamp and a second time stamp received exceeds the predetermined interval; and, if so, identifies mobile computing device entry into a sleep state during a time period indicated by the determined timestamp difference.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the present techniques. The various appearances of "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

It is to be understood that specifics in the aforementioned examples may be used anywhere in one or more embodiments. For instance, all optional features of the computing device described above may also be implemented with respect to either of the methods or the computer-readable medium described herein. Furthermore, although flow diagrams and/or state diagrams may have been used herein to describe embodiments, the techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. A method, comprising:
   requesting timestamps at predetermined intervals while in an active state and upon returning from a sleep state to an active state, while not requesting timestamps during the sleep state;
   receiving a first timestamp and a second time stamp in response to timestamp requests;
   capturing event information for the first timestamp or second timestamp or any combination thereof;
   identifying an application running in a foreground at the second timestamp, the identified application running in the foreground further identified as a triggering application;
   determining if a difference between a first time stamp and a second time stamp received exceeds the predetermined interval; and, if so,
   identifying mobile computing device entry into a sleep state during a time period indicated by the determined timestamp difference.

2. The method of claim 1, wherein operations of the mobile computing device are suspended during the sleep state.

3. The method of claim 1, wherein the event information of the second time stamp indicates a trigger for entry into the active state.

4. The method of claim 1, comprising rendering an illustration of a power state change comprising the identification of the entry into the sleep state in a graphical user interface of a display of the mobile computing device.

5. The method of claim 1, wherein the method is implemented in a user space of the mobile computing device as opposed to a kernel space of the mobile computing device.

6. The method of claim 1, wherein if entry into a sleep state is identified, further comprising one or more of:
identifying applications running at the first timestamp;
distinguishing applications running at the first timestamp as running in the foreground or background; or
identifying applications running at the second timestamp;
distinguishing applications running at the second timestamp as running in the foreground or background.

7. A system for monitoring power states, comprising:
a processing device;
a system memory, wherein the system memory comprises instructions executable by the processing device to initiate operations, the operations comprising:
request timestamps at predetermined intervals while in an active state and upon returning from a sleep state to an active state, while not requesting timestamps during the sleep state;
receive a first timestamp and a second time stamp in response to timestamp requests;
capture event information for the first timestamp or for the second timestamp or any combination thereof;
identify an application running in a foreground at the second timestamp, the identified application running in the foreground further identified as a triggering application;
determine if a difference between a first time stamp and a second time stamp received exceeds the predetermined interval; and, if so,
identify mobile computing device entry into a sleep state during a time period indicated by the determined timestamp difference.

8. The system of claim 7, wherein operations of the mobile computing device are suspended during the sleep state.

9. The system of claim 7, wherein the event information of the second time stamp indicates a trigger for entry into the active state.

10. The system of claim 7, the operations comprising rendering an illustration of a power state change comprising identification of the entry into the sleep state in a graphical user interface of a display of the mobile computing device.

11. The system of claim 7, wherein the operations are implemented in a user space of the mobile computing device as opposed to a kernel space of the mobile computing device.

12. The system of claim 7, wherein if entry into a sleep state is identified, the operations further comprising one or more of:
identifying applications running at the first timestamp;
distinguishing applications running at the first timestamp as running in the foreground or background; or
identifying applications running at the second timestamp;
distinguishing applications running at the second timestamp as running in the foreground or background.

13. A non-transitory computer readable medium including code, when executed, to cause a processing device to:
request timestamps at predetermined intervals while in an active state and upon returning from a sleep state to an active state, while not requesting timestamps during the sleep state;
receive a first timestamp and a second time stamp in response to timestamp requests;
capture event information for the first timestamp or the second timestamp or any combination thereof;
identify an application running in a foreground at the second timestamp, the identified application running in the foreground further identified as a triggering application;
determine if a difference between a first time stamp and a second time stamp received exceeds the predetermined interval; and, if so,
identify mobile computing device entry into a sleep state during a time period indicated by the determined timestamp difference.

14. The computer readable medium of claim 13, wherein the event information of the second time stamp indicates a trigger for entry into the active state.

15. The computer readable medium of claim 13, comprising code to cause the processing device to render an illustration of a power state change comprising identification of the entry into the sleep state in a graphical user interface of a display of the mobile computing device.

16. The computer readable medium of claim 13, wherein the code is implemented in a user space of the mobile computing device as opposed to a kernel space of the mobile computing device.

17. The computer readable medium of claim 13, wherein if entry into a sleep state is identified, further comprising code to cause the processing device to perform one or more of:
identifying applications running at the first timestamp;
distinguishing applications running at the first timestamp as running in the foreground or background; or
identifying applications running at the second timestamp;
distinguishing applications running at the second timestamp as running in the foreground or background.

18. The system of claim 7, wherein the system memory comprises instructions executable by the processing device to send all applications in the foreground to a background in response to entering of a sleep state, and identifying an application as a triggering application if the application is in the foreground at the second timestamp.

19. The system of claim 7, wherein the system memory comprises instructions executable by the processing device to identify the application running in the foreground during both entry into, and exit from, the sleep state, and identifying the application as causing an exit from the sleep state.

* * * * *